United States Patent Office 2,985,517
Patented May 23, 1961

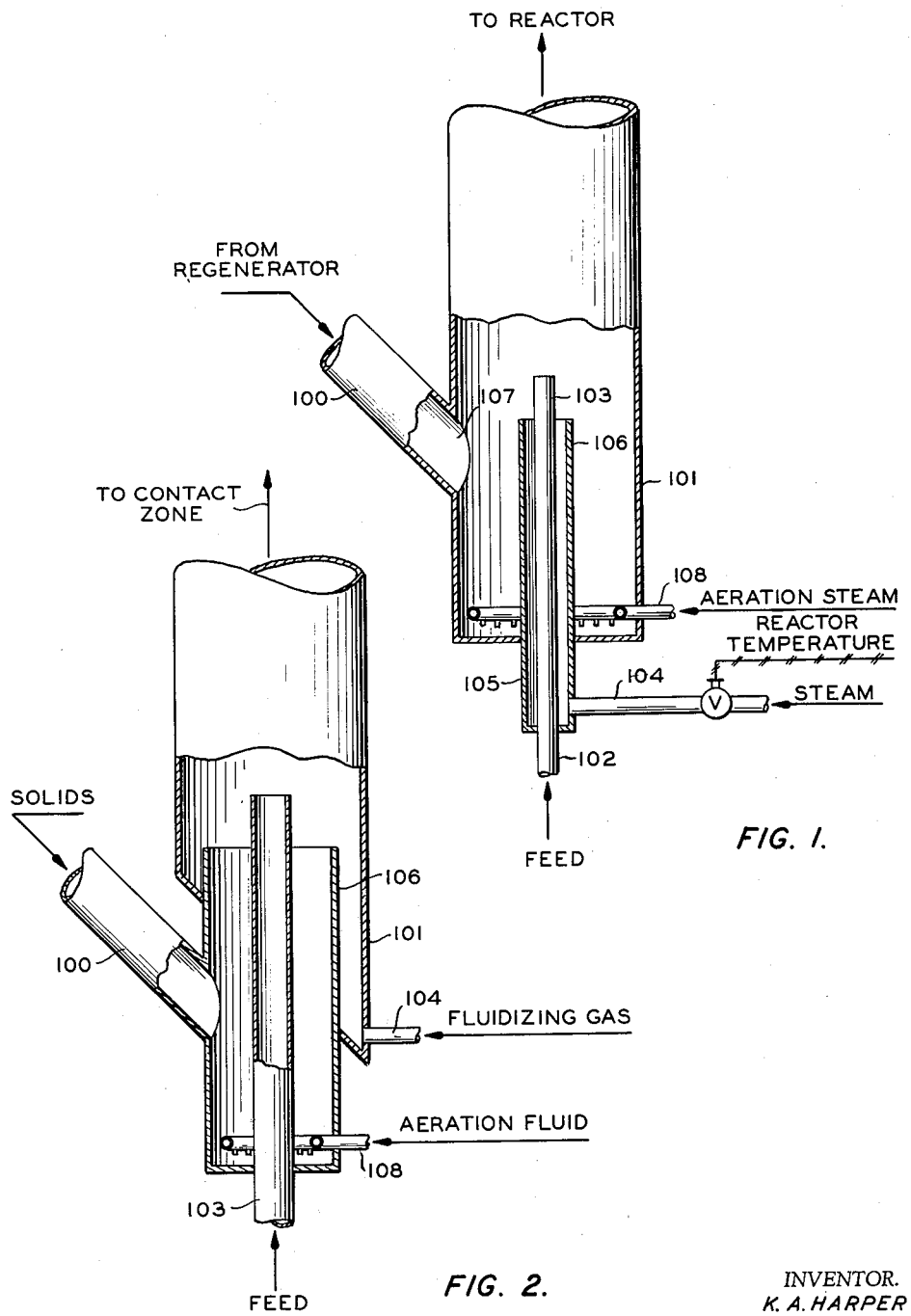

2,985,517
METHOD AND APPARATUS FOR CONTACTING AND CONVEYING OF FLUIDIZED SOLIDS AND FLUIDS TO BE CONTACTED THEREWITH

Kenneth A. Harper, Bartlesville, Okla., assignor to Phillips Petroleum Company, a corporation of Delaware Filed Mar. 14, 1957, Ser. No. 646,004

10 Claims. (Cl. 23—288)

This invention relates to the contacting and conveying of fluidized solids and fluids to be contacted therewith. In one of its aspects, the invention relates to a method and apparatus for fluidizing solids and admixing with said fluidized solids a fluid to be contacted therewith wherein the fluidized solids are essentially completely fluidized before the contacting of said fluid with said fluidized solids by introducing into a feeding section solids to be fluidized therein, introducing an aeration medium into a lower portion of said feeding section, introducing a fluidizing medium into said section above the point of introduction of said solids to said section, introducing said fluid material into said section above the point of introduction of said fluidizing medium and conveying the mixture thus obtained from said feeding section to a place where further desired handling or treatment can be effected. In another of its aspects, the invention provides a method and apparatus for feeding fluidized catalyst solids and hydrocarbon vapors to a reactor by admixing fresh or regenerated catalyst solids with the hydrocarbon in a riser pipe by introducing the solids into a bottom portion of a riser pipe, therein keeping the solids aerated with aeration steam, passing upwardly through the bottom of said pipe a fluidizing medium and releasing it into said pipe substantially above the level of the aerated solids therein thus fluidizing substantially only those aerated solids which are approximately at the level at which the fluidizing medium is introduced into said pipe and introducing the hydrocarbon at a level somewhat above that at which the fluidizing medium is introduced into said pipe. In a further aspect of the invention, temperature sensing means are provided in a reactor to which the fluidized catalyst solids and hydrocarbon vapors are admitted and the temperature sensing means are correlated with a fluidizing medium supply control valve in a manner as to vary the amount of catalyst fluidized in said pipe in a predetermined relationship with the temperature in the reactor.

Although the invention is particularly suited for use in so-called fluid catalytic cracking units wherein hydrocarbons are cracked in the presence of finely divided or fluidized catalyst particles, it will be understood by those skilled in the art in possession of this disclosure that the invention can readily be applied to other systems in which fluidized solids and fluids are to be admixed and fed to a point beyond the point of admixture.

The invention will now be described with respect to the treatment of hydrocarbons.

One of the principal problems in the treatment of large quantities of hydrocarbons in the oil refinery today is found at the place at which the hydrocarbon liquid or vapor or mixture of liquid and vapor is contacted with the fluidized catalyst. This mixing heretofore has involved the use of slide valves, principally in the pipe feeding fresh or regenerated catalyst to the so-called riser which leads the mixture of fluidized catalyst and hydrocarbons to the reactor vessel. This slide valve is subjected to a good bit of erosion. Furthermore, eddy currents caused by prior methods and in prior apparatus have resulted in erosion of various portions of apparatus involved.

It is an object of this invention to provide a method and apparatus for contacting and conveying of fluidized solids and fluids to be contacted therewith. It is a further object of this invention to provide a method and means for admixing finely divided catalyst solids and hydrocarbon liquids and/or vapors to be contacted with said solids. A still further object of the invention is to provide a method and apparatus for contacting solids and fluids to be admixed therewith in a manner so as to avoid erosion and other undesirable effects.

Other aspects and objects are apparent from this description, the drawing and the appended claims.

According to this invention, there is provided a method for feeding a mixture of fluidized solids and a fluid material to be contacted therewith into a contacting zone which comprises introducing into a feeding section located below and in communication with said zone solids to be fluidized therein, introducing an aeration medium into a lower portion of said feeding section, introducing a fluidizing medium into said section above the point of introduction of said solids to said section, introducing said fluid material into said section above the point of introduction of said fluidizing medium and conveying the said mixture, thus obtained, to said zone.

Further, according to the method of the invention, the introduction of the fluidizing medium is effected responsive to the temperature in said contacting zone.

Also, according to the invention, there is provided an apparatus for feeding fluidized solids in an upwardly direction admixed with a fluid to be contacted therewith which comprises in combination a feeding section; means for discharging into said feeding section at a lower portion thereof an aeration fluid; means for feeding solids to be fluidized into said portion of said section; means for introducing fluidizing medium into said section just above said portion of said section and above the place at which said solids are fed into said portion of said section; and means for feeding said fluid to be contacted with said fluidizing solids into said section at a place above the place at which said fluidizing medium is introduced.

In a more specific form of the invention, there is provided an apparatus for feeding fluidized solids in a substantially upwardly direction which comprises in combination a substantially vertically disposed feed pipe, closed at its lower end, for feeding said fluidized solids; a conduit communicating with said feed pipe at a lower end portion thereof, for supplying fluidized solids into the lower end of said feed pipe; an injection means at the lower end of said feed pipe, for supplying aeration fluid to said lower end of said feed pipe; a substantially axially disposed pipe of relatively smaller diameter in the lower end of said feed pipe in communication with the interior of said feed pipe and positioned to extend through said closed lower end of said feed pipe and to extend upwardly into said feed pipe beyond the confluence point of said conduit and said feed pipe; said axially disposed pipe being closed at its lower end; a fluidizing and carrying medium supply conduit in open communication with said axially disposed pipe at its lower end and externally of said feed pipe; and a fluid feed conduit of relatively smaller diameter disposed axially within said axially disposed pipe extending from a point below the closed end of said axially disposed pipe through said closed end to a point above its upper end within said feed pipe, for feeding fluid to be contacted with said fluidized solids into contact therewith in said feed pipe.

There is shown in the drawing an embodiment of the apparatus according to the invention.

Figure 1 is a vertical view, shown partly in vertical cross-section, of an apparatus according to the invention in which the solids are introduced annularly with respect to the fluidizing medium and the feed or fluid to be contacted therewith is introduced concentrically with respect to the solids and fluidizing medium.

Figure 2 is a vertical view also taken partly in cross-section of an apparatus according to the invention in which the fluidized solids are introduced concentrically with respect to the fluidizing medium. In this embodiment, the feed or fluid to be contacted with the solids is also introduced concentrically.

Figure 3:
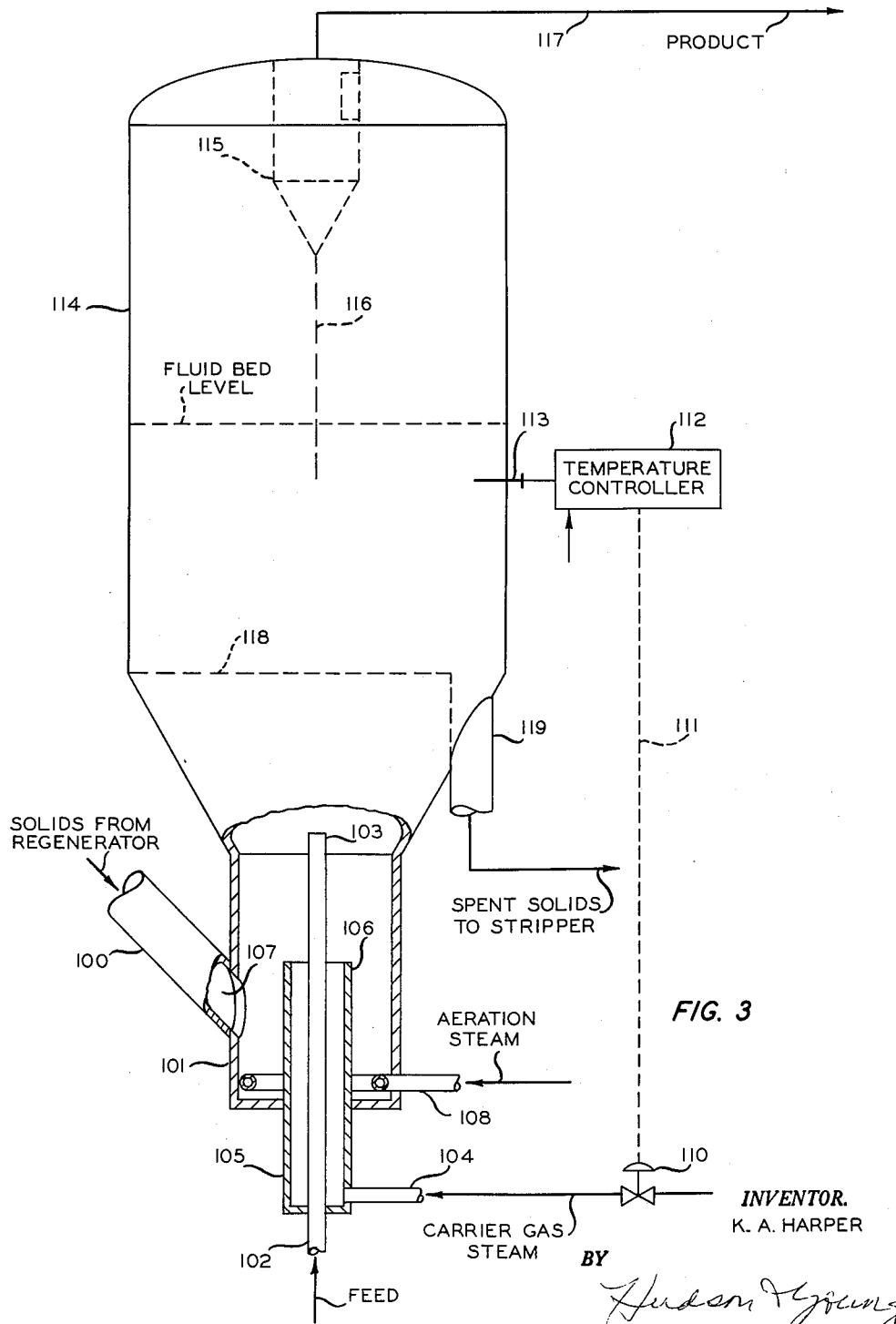
Figure 3 is a vertical view of the apparatus of the embodiment illustrated in Figure 1 of the drawing showing the relation therewith of the reactor, temperature sensing means, and the control valve in carrier medium conduit.

Referring now to Figure 1, catalyst from a catalyst regenerator flows via downleg 100 with no control valve into the lower portion of a reactor riser 101. Oil feed is introduced via line 102 with outlet 103 located well above locus 107 to minimize eddy flow and resulting erosion of the apparatus. Control and carrier steam is passed via the control valve in line 104 to the annular chamber 105 surrounding the lower portion of oil inlet 102. The steam outlet 106 is located at about the locus 107. 108 is the aeration steam inlet pipe. The location of the annular steam outlet 106 is just below the outlet for oil 103. Obviously, the oil outlet 103 and steam outlet 106 can extend further up the riser. In this preferred system, I have eliminated the slide valve and the inherent troubles which accompany use of such restrictions; I have extended the oil inlet to well above the solids introduction locus to minimize eddy currents and resulting erosion. I have extended the control steam outlet to a higher level to also minimize erosion and have installed a valve in the non-erosion steam line to control flow of solids (and oil) to the reactor.

Referring now to Figure 2, in which the same numbering as in Figure 1 has been used for corresponding parts of the apparatus, it will be noted that the catalyst or fluidized solids are fed by way of pipe 100 into the lower portion of pipe 106 wherein aeration fluid or steam is introduced by way of pipe 108. The aerated solids tend to overflow at the top of pipe 106 and are picked up by fluidizing steam introduced by way of pipe 104. Finally, feed, in this case oil vapor to be converted in a reactor situated above pipe 101 but not shown, is introduced by way of pipe 103 and intermingles with the just fluidized catalyst as it rises through pipe 101.

Referring now to Figure 3, catalyst from a catalyst regenerator flows via downleg 100 with no control valve into the lower portion of reactor riser 101. Oil feed is introduced via line 102 with outlet 103 located well above locus 107 to minimize eddy flow and resulting erosion of the apparatus. Control and carrier gas is passed via the control valve 110 in line 104 to the annular chamber 105 surrounding the lower portion of feed inlet 102. The carrier gas outlet 106 is located at about locus 107. 108 is the aeration fluid inlet pipe. The location of the annular fluid outlet is below the outlet for feed 103. Valve 110 is actuated by a signal transmitted via line 111 in response to the signal transmitted from temperature controller 112 to which is transmitted a signal from temperature sensing means 113 (e.g., a thermocouple) which signal is proportional to the temperature of the solids within the reactor vessel 114. 115 represents a cyclone separator in reactor 114 to allow product to be removed therethrough via outlet line 117 and solids to be returned into the fluidized bed by leg 116. 118 represents a grid, and 119 the spent solids draw-off or downcomer, said spent solids being subsequently stripped and charged to a regenerator. As the temperature of the reactor 114 attempts to change to above or below, respectively, a preset temperature, the signal sensed by means 113 and transmitted via 112, and 111 to valve 110 effects a shutting down or opening up, respectively, of valve 110 to maintain the preset temperature in reactor 114.

In a specific operation utilizing my invention, I employ a silica-alumina catalytic cracking catalyst ranging in particle size from about 0 to 150 microns. This catalyst is introduced into the contact section 101 via line 100 at the rate of 4,320 tons per day at a temperature of 1100° F. Via line 102, I introduce a hydrocarbon feed, virgin gas oil, having an API gravity (60° F./60° F.) of 29.0. This feed is added at the rate of 3,000 barrels per day at a temperature of 600° F. The resulting catalyst-to-oil weight ratio is 9.3:1.0. Fluidizing steam is introduced via line 104 at the rate of 1,200 pounds per hour at 360° F., and aerating steam is added via line 108 at the rate of 400 pounds per hour at 360° F.

It will be understood by those skilled in the art in possession of this disclosure that whereas feed pipe 103 in the figures of the drawing is shown to pass upwardly through the bottom or closed end of pipe 106, it is within the scope of the invention and the appended claims thereto to position this feed pipe in any manner as long as its outlet of fluid to be contacted with the solids is at the place at which the solids and fluidizing medium have been at least admixed in part so that the fluid is fed into fluidized solids for rapid and uniform admixture therewith.

As indicated herein, it will be obvious to one skilled in the art in possession of this disclosure that the method and apparatus can be employed for admixing regeneration fluid with a used catalyst. For example, in the event catalyst is to be regenerated, it is introduced through pipe 100, it will be aerated with air and/or steam and the fluidizing medium will be a regeneration gas which can have the composition of regeneration gases ordinarily employed in the art. Clearly, the invention is in the modus operandi of admixing fluidized or fluidizable solids with fluid fed as described.

Reasonable variation and modification are possible within the scope of the foregoing disclosure, drawing, and claims to the invention the essence of which is that a method and apparatus for admixing fluidizing medium and solids and fluid to be contacted with said solids have been set forth substantially as described wherein the solids are fluidized and contacted with the fluid to be contacted with said solids without the use of slide valves and at a place above the confluence of the pipe feeding the solids to the feeding pipe wherein the final admixture is accomplished and wherein the fluidizing medium is introduced substantially above the bed of solids which, though aerated, are not fluidized in order to fluidize only those solids which are near the point of introduction of the fluidizing medium, thus to permit operating upon the solids and fluidizing these responsive to any desired condition by controlling the rate of flow of fluidizing medium into the top portion of the aerated solids.

I claim:

1. Apparatus for feeding fluidized solids in a substantially upwardly direction which comprises, in combination, a substantially vertically disposed feed pipe, closed at its lower end, for feeding said fluidized solids; a conduit communicating with said feed pipe at a lower end portion thereof, for supplying fluidized solids into the lower end of said feed pipe; an injection means in the lower end of said feed pipe, for supplying aeration fluid to said lower end of said feed pipe; a substantially axially disposed pipe of relatively smaller diameter in the lower end of said feed pipe in communication with the interior of said feed pipe and positioned to extend through said closed lower end of said feed pipe and to extend upwardly into said feed pipe beyond the confluence point of said conduit and said feed pipe; said axially disposed pipe being closed at its lower end; a fluidizing and carrying medium supply conduit in open communication with said axially disposed pipe at its lower end and externally of said feed pipe; and a fluid feed conduit of relatively smaller diameter disposed axially within said axially disposed pipe extending from a point below the closed end of said axially disposed pipe through said closed end to a point above its upper end within said feed pipe, for feeding fluid to be contacted with said fluidized solids into contact therewith in said feed pipe.

2. Apparatus suitable for converting an organic material in the presence of fluidized solids comprising in combination a converter vessel, for converting said materials in presence of said solids; a feed pipe located substantially below said vessel disposed in a substantially upright position and at its upper end being in open communication with the interior of said vessel for feeding said materials and solids into said vessel and closed at its lower end; a conduit communicating with said feed pipe at a lower end portion thereof, for supplying fluidized solids into the lower end of said feed pipe; an injection means in the lower end of said feed pipe, for supplying aeration fluid to said lower end of said feed pipe; a substantially axially disposed pipe of relatively smaller diameter in the lower end of said feed pipe in communication with the interior of said feed pipe and positioned to extend through said closed lower end of said feed pipe and to extend upwardly into said feed pipe beyond the confluence point of said conduit and said feed pipe; said axially disposed pipe being closed at its lower end; a fluidizing and carrying medium supply conduit in open communication with said axially disposed pipe at its lower end and externally of said feed pipe; a fluid feed conduit of relatively smaller diameter disposed axially within said axially disposed pipe extending from a point below the closed end of said axially disposed pipe through said closed end to a point above its upper end within said feed pipe for feeding fluid to be contacted with said fluidized solids into contact therewith in said feed pipe; sensing means to sense the temperature in said vessel, regulating means in said fluidizing and carrying medium supply conduit for regulating the supply of medium to said axially disposed pipe responsive to change in said temperature; and means for relaying change in said temperature from said sensing means to said regulating means.

3. Apparatus for feeding fluidized solids in an upwardly direction admixed with a fluid to be contacted therewith which comprises in combination a feeding section; means for discharging an aeration fluid into said feeding section at a lower point thereof, means for feeding solids to be fluidized into the bottom of said section; means for introducing fluidizing medium into the bottom just above said portion of said section and above the place at which said solids are fed into said portion of said section; means in said section for conducting a column of fluidized solids in an upwardly direction; and means for feeding said fluid to be contacted with said fluidized solids into said section axially into said column of fluidized solids at a place above the place at which said fluidizing medium is introduced.

4. Apparatus for the conversion of an organic material such as a hydrocarbon fluid which comprises in combination a reactor, a riser pipe for feeding a mixture of fluidized catalyst solids and hydrocarbon fluid into said reactor, located substantially below said reactor, a feeding section in said riser pipe; means for discharging into said feeding section at a lower point therefor an aeration fluid; means for feeding catalyst solids to be fluidized into the bottom of said section; means for introducing fluidizing medium into said section just above the bottom of said section and above the place at which said catalyst solids are fed into the bottom of said section; means for feeding said hydrocarbon fluid into said section at a place above the place at which the fluidizing medium is introduced; temperature sensing means in said reactor, controlling means upon said means for introducing fluidizing medium for controlling the flow of medium into said section and means for relaying change in temperature in said reactor to said controlling means.

5. Apparatus for substantially upwardly feeding a fluidized mass of particulate solids comingled with a fluid to be contacted therewith which comprises in combination a substantially vertically disposed feed pipe, a substantially downwardly directed pipe peripherally communicating with a lower portion of the periphery of said feed pipe for feeding fluidized solids into the bottom of said feed pipe, an aeration fluid means located in the bottom of said feed pipe for feeding aeration fluid into fluidized solids in the bottom of said feed pipe, a fluidizing medium feed pipe communicating with the exterior of said feed pipe and with a point in said feed pipe located above the place of communication of said downwardly directed pipe with said feed pipe adapted to feed upwardly to said point a column of fluidized solids, and a fluid feed pipe for forwarding fluid to a point on the axis of said column just above said first-mentioned point.

6. Apparatus for substantially upwardly feeding a comingled mass of fluidized solids and a fluid to be contacted therewith comprising in combination a substantially vertically disposed feed pipe, a substantially downwardly-directed solids feed pipe peripherally communicating with a lower point of said feed pipe, means communicating with the exterior of said feed pipe and at least one point within said feed pipe at the bottom thereof for introducing aeration fluid into said feed pipe, a substantially concentrically disposed fluidizing medium supply pipe extending through the bottom of said feed pipe to a point in said feed pipe above the junction of said downwardly-directed particulate solids feed pipe and said feed pipe for feeding fluidizing medium into said feed pipe and a fluid feed pipe substantially concentrically disposed in said fluidizing medium supply pipe communicating with the exterior and with a point within said feed pipe located above the point to which said fluidizing medium supply pipe supplies fluidizing medium.

7. Apparatus for substantially upwardly feeding a comingled mass of fluidized solids and a fluid to be contacted therewith which comprises in combination a substantially vertically disposed feed pipe closed at its lower end, an aerated particulate solids-containing pipe extending upwardly substantially concentrically and opening into the bottom of said feed pipe forming an annulus defined by the wall of said feed pipe and said aerated solids-containing pipe, means for feeding a fluidizing medium into said annulus, means for feeding particulate solids into said particulate solids-containing pipe at a point substantially below its communication with said feed pipe and a fluid feed pipe extending upwardly through said aerated solids-containing pipe and substantially concentrically disposed therein communicating with a point outside the apparatus and a point substantially above that at which said aerated solids-containing pipe communicates with said feed pipe.

8. A method for feeding a mixture of fluidized solids and a fluid material to be contacted therewith into a contacting zone which comprises introducing into a feeding section, located below and in communication with said zone, solids to be fluidized therein; introducing an aeration medium into a lower point of said feeding section to aerate and thus to raise the level of the fluidized solids therein by expansion of the volume of said solids; introducing a fluidizing medium into said section above the point of introduction of said solids to said section, and adjusting the aeration medium flow rate to expand and thus raised aerated solids to the point at which fluidizing medium is introduced to said section; controlling the flow rate of aerated solids into said fluidizing medium and, therefore, the flow rate of the mixture of fluidizing medium and solids from said section to said contacting zone by adjusting the rate of flow of said fluidizing medium; introducing said fluid material into said section above the point of introduction of said fluidizing medum, controlling the rate of introduction of said fluidizing medium responsive to the temperature of the fluidized material in said contacting zone, and conveying the said mixture, thus obtained, to said zone.

9. An apparatus for feeding a mixture of fluidized solids and a fluid material to be contacted therewith into a contacting zone which comprises a contacting means, a feeding means located below and in communication with said contacting means, additional means for introducing solids to be fluidized into said feeding means, additional means for introducing an aeration medium into a lower part of said feeding means, additional means for introducing a fluidizing medium into said feeding means above the introduction of solids into said feeding means, and additional means for introducing said fluid material into contact with the fluidized solids at a level above the introduction of the fluidizing medium.

10. A method for feeding a mixture of fluidized solids and a fluid material to be contacted therewith into a contacting zone, which comprises introducing into a feeding section located below and in communication with said zone, solids to be fluidized therein, introducing an aeration medium into a lower portion of said feeding section, introducing a fluidizing medium into said section above the point of introduction of said solids to said section, raising a column of fluidized solids in said section, introducing said fluid material axially into said column in said section above the point of introduction of said fluidizing medium and controlling the rate of introduction of said fluidizing medium responsive to the temperature of the fluidized material in said contacting zone and conveying the said mixture thus obtained to said zone.

References Cited in the file of this patent
UNITED STATES PATENTS

| | | |
|---|---|---|
| 2,587,670 | Weinrich | Mar. 4, 1952 |
| 2,600,528 | Grace | June 17, 1952 |
| 2,723,180 | Cellani | Nov. 8, 1955 |
| 2,735,803 | Leffer | Feb. 21, 1956 |
| 2,769,693 | Bearer | Nov. 6, 1956 |

UNITED STATES PATENT OFFICE

CERTIFICATE OF CORRECTION

Patent No. 2,985,517 May 23, 1961

Kenneth A. Harper

It is hereby certified that error appears in the above numbered patent requiring correction and that the said Letters Patent should read as corrected below.

Column 5, lines 48 and 49, for "the bottom just above said portion" read -- said section just above the bottom --; column 6, line 66, for "raised" read -- raise --; line 74, for "medum" read -- medium --.

Signed and sealed this 7th day of November 1961.

(SEAL)
Attest:

ERNEST W. SWIDER
Attesting Officer

DAVID L. LADD
Commissioner of Patents
USCOMM-DC